(12) United States Patent
Calcaterra et al.

(10) Patent No.: US 11,102,215 B2
(45) Date of Patent: *Aug. 24, 2021

(54) GRAPHICAL USER INTERFACE PRIVACY, SECURITY AND ANONYMIZATION

(71) Applicant: INTERNATIONAL BUSINESS MACHINES CORPORATION, Armonk, NY (US)

(72) Inventors: Jeffrey A. Calcaterra, Chapel Hill, NC (US); Erik Rueger, Ockenheim (DE); Christof Schmitt, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/593,335

(22) Filed: Oct. 4, 2019

(65) Prior Publication Data

US 2020/0036725 A1     Jan. 30, 2020

Related U.S. Application Data

(63) Continuation of application No. 15/609,515, filed on May 31, 2017, now Pat. No. 10,554,669.

(51) Int. Cl.
*H04L 29/06* (2006.01)
*G06F 3/048* (2013.01)

(52) U.S. Cl.
CPC ............ *H04L 63/105* (2013.01); *G06F 3/048* (2013.01); *H04L 63/0421* (2013.01); *H04L 63/083* (2013.01)

(58) Field of Classification Search
CPC . H04L 63/105; H04L 63/0421; H04L 63/083; G06F 3/048
See application file for complete search history.

(56) References Cited

U.S. PATENT DOCUMENTS

| | | | |
|---|---|---|---|
| 8,527,814 B1 | 9/2013 | Elwell et al. | |
| 8,650,640 B2* | 2/2014 | Calcaterra | G06F 21/74 726/23 |
| 8,856,869 B1 | 10/2014 | Brinskelle | |
| 9,015,281 B2 | 4/2015 | Moffat | |
| 9,176,651 B2* | 11/2015 | Schubert | G06F 3/048 |

(Continued)

OTHER PUBLICATIONS

SdcMicro, CRAN, May 4, 2015, https://web.archive.org/web/20150522212405/https://cran.r-project.org/web/packages/sdcMicro/sdcMicro.pdf, Oct. 13, 2020, pp. 1-86.*

(Continued)

*Primary Examiner* — Jeffery L Williams
(74) *Attorney, Agent, or Firm* — Kristofer L. Haggerty

(57) ABSTRACT

A method, computer system, and a computer program product for restricting and anonymizing a graphical user interface for a remote access session is provided. The present invention may include determining a plurality of appropriate permissions for the graphical user interface of a client computer for fixing a problem. The present invention may also include determining a plurality of restricted graphical user interface panels associated with the graphical user interface, wherein the determined plurality of restricted graphical user interface panels includes a minimum access level for the third party to fix the problem.

20 Claims, 5 Drawing Sheets

(56) References Cited

U.S. PATENT DOCUMENTS

| | | | |
|---|---|---|---|
| 9,361,469 B2* | 6/2016 | Thiyagarajan | G06F 3/1454 |
| 9,460,298 B1 | 10/2016 | Duhaime et al. | |
| 9,514,333 B1* | 12/2016 | Patel | H04L 63/0428 |
| 9,780,966 B2* | 10/2017 | Bomgaars | H04L 63/0823 |
| 9,858,426 B2* | 1/2018 | Freudiger | G06F 21/6254 |
| 9,971,898 B2* | 5/2018 | Badstieber | H04L 63/08 |
| 10,084,757 B2* | 9/2018 | Yeager | H04L 67/22 |
| 10,089,166 B2 | 10/2018 | Lehmann et al. | |
| 10,255,156 B2* | 4/2019 | Frenz | G06F 11/323 |
| 10,397,201 B2* | 8/2019 | Schimmelpfeng | H04L 63/0421 |
| 2004/0133547 A1 | 7/2004 | Doi | |
| 2007/0061460 A1 | 3/2007 | Khan et al. | |
| 2007/0127696 A1 | 6/2007 | White | |
| 2007/0277061 A1 | 11/2007 | Ashe | |
| 2012/0027195 A1* | 2/2012 | Shaffer | H04M 3/42221 379/265.09 |
| 2013/0318347 A1 | 11/2013 | Moffat | |
| 2014/0310522 A1* | 10/2014 | Bomgaars | H04L 12/6418 713/168 |
| 2015/0278534 A1* | 10/2015 | Thiyagarajan | G06F 21/84 726/28 |
| 2015/0302621 A1* | 10/2015 | Liu | G06F 21/604 345/647 |
| 2015/0319178 A1 | 11/2015 | Desai et al. | |
| 2016/0301766 A1* | 10/2016 | Ionescu | G06F 16/172 |
| 2018/0219849 A1* | 8/2018 | Jones | H04L 67/20 |
| 2018/0351961 A1 | 12/2018 | Calcaterra et al. | |

OTHER PUBLICATIONS

Lehmann et al., "Configuring and Utilizing Call-Home Systems," Application and Drawings, filed Mar. 8, 2016, 36 Pages, U.S. Appl. No. 15/063,879.

LiveLOOK, "Screen Sharing Security and Privacy Masking Available by LiveLOOK," LiveLOOK, Inc. Announcement, Mar. 2, 2011, 2 Pages, Matawan, NJ.

Mell et al., "The NIST Definition of Cloud Computing," National Institute of Standards and Technology, Sep. 2011, p. 1-3, Special Publication 800-145.

Wikipedia, "Data Anonymization," Wikipedia: the Free Encyclopedia, Last Modified on Jan. 4, 2017, p. 1-2, https://en.wikipedia.org/wiki/Data_anonymization, Accessed on Apr. 13, 2017.

Microsoft, "Connect to another computer using Remote Desktop Connection", Applies to: Windows 7, Sep. 25, 2019, 3 pages.

Prasser et al., "A tool for Optimizing De-Identified Health Data for Use in Statistical Classification", 2017 IEEE 30th International Symposium on Computer-Based Medical Systems, pp. 169-174.

IBM: List of IBM Patents or Patent Applications Treated as Related (Appendix P), Oct. 4, 2019, pp. 1-2.

* cited by examiner

GRAPHICAL USER INTERFACE PRIVACY, SECURITY AND ANONYMIZATION

BACKGROUND

The present invention relates generally to the field of computing, and more particularly to computer security.

When supporting, for example, storage systems, server or software products used by customers, many problems can be diagnosed and resolved by allowing remote desktop access in which a support engineer analyzes the issue and provides action plans to the customer to resolve the issue. With more difficult problems, the support engineer may remotely access the system graphical user interface (GUI) to diagnose and resolve the problem.

Some customers, however, are unwilling to allow remote access to diagnose and fix these issues due to security concerns. Some concerns are that an intruder could obtain unauthorized access and manipulate the system, retrieve customer confidential data, corrupt customer data, or change the system without the knowledge of the customer. Other concerns are that a third party could obtain more privileges or access than what are essential to perform an intended task or function.

SUMMARY

Embodiments of the present invention disclose a method, computer system, and a computer program product for restricting and anonymizing a graphical user interface for a remote access session. The present invention may include determining a plurality of appropriate permissions for the graphical user interface of a client computer for fixing a problem, wherein the determined plurality of appropriate permissions is structured based on the problem by a plurality of error messages, wherein the plurality of error messages includes one or more sets of if-then protocols, wherein a plurality of sensitive data is determined within the graphical user interface based on the determined plurality of appropriate permissions, wherein the determined plurality of sensitive data is anonymized. The present invention may also include determining a plurality of restricted graphical user interface panels associated with the graphical user interface, wherein the determined plurality of restricted graphical user interface panels includes a minimum access level for the third party to fix the problem.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
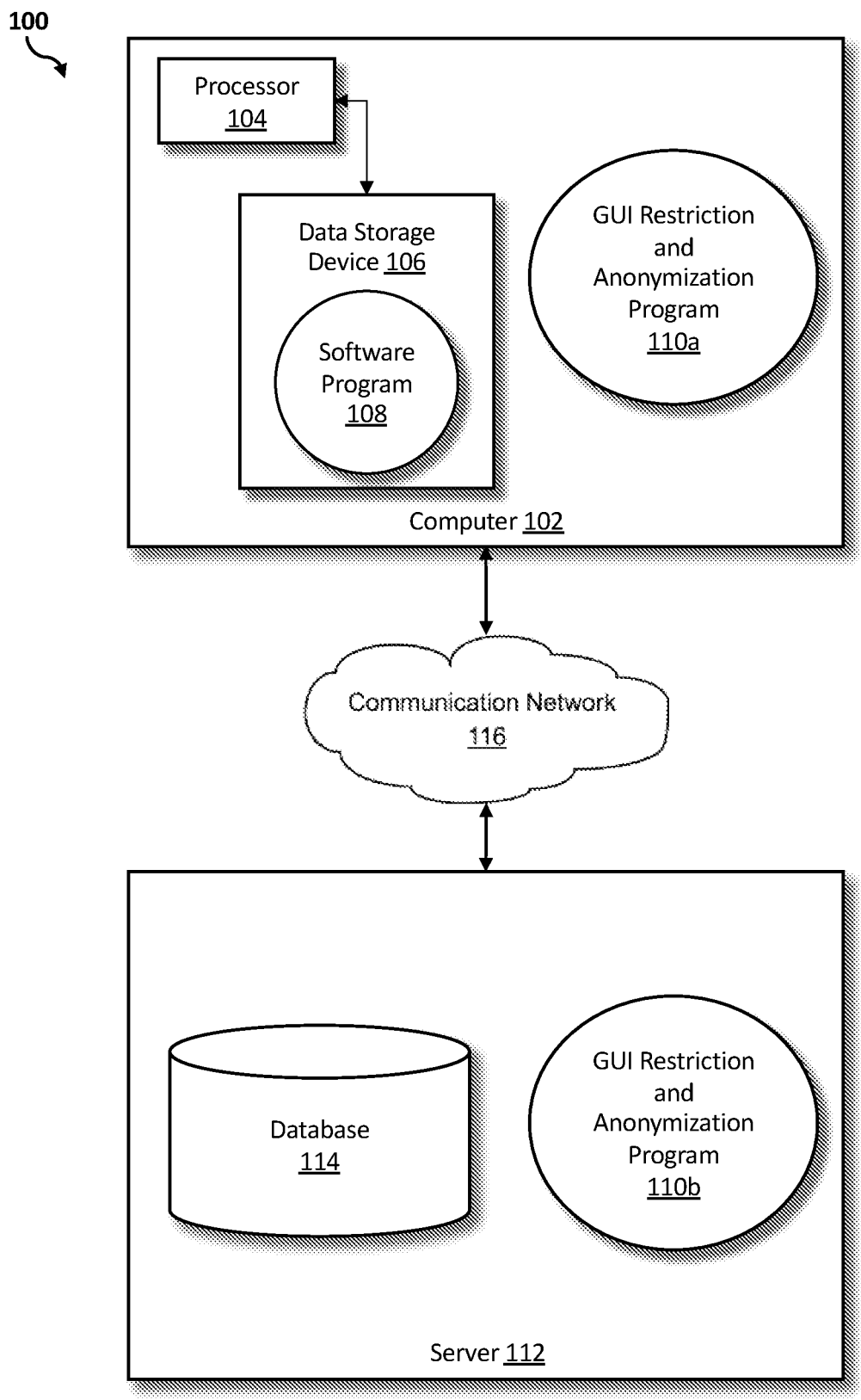
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language, Python programming language, or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for restricting and anonymizing graphical user interfaces (i.e., GUI). As such, the present embodiment has the capacity to improve the technical field of computer security by permitting the user to anonymize the GUI or restrict access to the GUI for privacy and security purposes when another person remotely accesses the client computer of a customer system administrator. More specifically, the GUI restriction and anonymization program may receive a remote access request from a third party requesting remote access of the client computer to diagnose and fix a computer-related issue. Before the GUI restriction and anonymization program grants access to the third party, a known cognitive processing system may be utilized to diagnose the use and determine the appropriate access (i.e., permissions) that may be granted to the third party. The GUI restriction and anonymization program then contacts the customer system administrator to confirm the computer-related issue and for the customer system administrator to determine whether to temporarily change the permissions. Depending on the responses of the customer system administrator, the remote access session may commence in which the third party may be granted limited access to the client computer. If the issue is resolved, then the remote access session may be terminated and the temporary permission changes may automatically expire and reverted to the original permissions. If the problem is not resolved, then the remote access session may be terminated and the customer system administrator may elect to continue to GUI restriction and anonymization program to resolve the issue.

As described previously, when supporting, for example, storage systems, server or software products used by customers, many problems can be diagnosed and resolved by allowing remote desktop access in which a support engineer analyzes the issue and provides action plans to the customer to resolve the issue. With more difficult problems, the support engineer may remotely access the system graphical user interface (GUI) to diagnose and resolve the problem.

Some customers, however, are unwilling to allow remote access to diagnose and fix these issues due to security concerns. Some concerns are that an intruder could obtain unauthorized access and manipulate the system, retrieve customer confidential data, corrupt customer data, or change the system without the knowledge of the customer. Other concerns are that a third party could obtain more privileges or access than what are essential to perform an intended task or function. Therefore, support engineers have to resort to less effective methods, which are time-consuming, error-prone and insecure, as alternatives to remote desktop access.

Therefore, it may be advantageous to, among other things, provide a method, computer system or computer program product for increasing customer control over remote desktop support thereby allowing customer privacy, while allowing the support engineers to utilize remote desktop access to diagnose and fix issues with the remote computer.

According to at least one embodiment, the GUI may be anonymized by eliminating or replacing private information with predefined data. Whenever the customer system administrator may suspect a computer-related issue, the customer system administrator may allow the remote support engineer to access the GUI. The GUI may have an option for the customer system administrator to select which part of the GUI should be restricted or modified by depersonalizing the terms by renaming certain files, removing or replacing the company name, filtering (e.g., deleting customer private information), and replacing internet protocol (IP) addresses by default ranges in the view. The customer system administrator may restrict or modify the access granted to remote support engineer by utilizing predefined options, such as, suppressing the network configuration information and transmission control protocol/internet protocol (TCP/IP), removing personalized information, and obfuscating name information. In addition, a company name may be eliminated on each screen or IP addresses may be replaced by alias IP addresses.

According to at least one embodiment, the customer system administrator may restrict GUI access prohibiting actions by a third party (i.e., intruder, hacker or remote support engineer) without the approval of the customer system administrator. Each action that may change the behavior of the system may be protected by a password to be entered by the customer system administrator. Whenever the third party may attempt to change such configurations, the customer system administrator may enter a predefined password to allow the third party to proceed with the change. This approach may protect against manipulation of the system configuration without the approval of the customer system administrator, and may promote a privacy option with the remote connection. According to at least one other embodiment, an approval step in the action taken by the third party may limit the risk of action against the rules of the customer system administrator, similar to the change process. For example, some GUI panels may be hidden or inaccessible, while other GUI panels are protected by a password to be entered by the customer system administrator.

The present embodiment may include a range of restricting options from restricting the complete configuration panels down to a specific option, such as a single IP address within a configuration panel. According to at least one embodiment, restricting the GUI may be defined for a specific service user role, which holds the predefined configuration for individual remote support users/groups that can be reused for further remote support sessions. Therefore, restriction of the GUI may allow the customer system administrator to capture the history of given permissions and the logging of changes for reuse in the future to give the option to the customer system administrator to allow the access as was given before without approval.

According to at least one embodiment, permissions and obfuscation may be structured based on specific problem types. The structure may be driven by error messages from the GUI restriction and anonymization program, including a set of if-then protocols (e.g., runbooks), or the input of a cognitive processing system in which multiple processes could be applied at once. The cognitive processing system may utilize computing technology (e.g., Watson Analytics™, Watson Analytics and all Watson Analytics-based trademarks and logos are trademarks or registered trademarks of International Business Machines Corporation and/or its affiliates) to analyze the client computer and diagnose the issue with the client computer.

The present embodiment may include obtaining permissions and information based on the appropriate stage in the process. As the third party attempts to gain access to restrictive GUI panels of the client computer, the permission and information may reveal changes accordingly. Such progression of permissions may be a part of the troubleshooting or repair process undertaken by the third party. According to at least one embodiment, the level of obfuscation or access level may be derived from the level of access and the type of problem. For example, the progression may start with just showing an obfuscated IP Address, then to showing that multiple IP addresses may be a common subnet, to revealing the actual address.

According to at least one embodiment, known algorithms may determine which values are sensitive. For privacy, the sensitivity of values may be based on local regulations or norms of the geography. For security, the sensitivity of values may be based on the potential impact of allowing permissions (e.g., potential harm that could be done from root versus user access) or access to specific settings. This determination may be based on a set of policies, or on an analysis conducted by the cognitive processing system.

The present embodiment may include the cognitive processing system prompting the customer system administrator to confirm the issue and informing the customer system administrator which GUI panels of the client computer may be accessed to fix the issue. Therefore, the cognitive processing system may restrict the options of, or deny access to, a malicious actor (i.e., hacker, unauthorized user or intruder) who may want a more intrusive access level rather than the minimal access given to fix the issue. The third party may be granted the appropriate permissions for fixing the issue rather than full access to the client computer. According to at least one embodiment, the cognitive processing system may be an ongoing process that may continue during the remote access session, as well as when the customer system administrator decides to temporarily change the permissions of the client computer.

According to at least one embodiment, the customer system administrator may change permissions during the remote access session with the third party. Instead of obfuscating values (e.g., IP addresses, names, companies), the customer system administrator may conduct a search on the client computer and prevent the loss of information obtained by the third party. For example, all instances of 11.1.2.1 may be replaced with Address1 so that the third party may observe that the same address may be appearing multiple times. The obfuscated values may be implemented with names, companies and other personal identifiers.

The present embodiment may include permitting the customer system administrator to specify with a continuum of options related to access. The customer system administrator may select or modify proposed logs, hide certain GUI panels, restrict all access to the GUI, or filter the content appropriately before or during a remote access session with the third party. Therefore, the GUI restriction and anonymization program may promote flexibility of the configuration, security and privacy for the customer system administrator, and the customer system administrator may observe and act on previous protected content and menus during the remote access session.

According to at least one embodiment, the customer system administrator may select a trusted secondary person (i.e., manager, co-worker or friend) to monitor remote access when the customer system administrator is unavailable. The GUI restriction and anonymization program may prompt the customer system administrator to confirm the problem presented by the third party and to confirm the level of access necessary to fix the issue. In addition, the customer system administrator may temporarily change the permissions (not the default settings) granted to the third party. As such, for the situations in which the customer system administrator may be unavailable or unresponsive to electronic device notifications from the GUI restriction and anonymization program, the customer system administrator may elect a secondary person to receive such notifications. The secondary person may act as the customer system administrator by confirming the issue and temporarily changing the permissions. The customer system administrator may, however, opt to "turn off" this option to notify a secondary person when the customer system administrator is unavailable or unresponsive. Therefore, the GUI restriction and anonymization program may not notify a secondary person, and the remote access session may terminate until the customer system administrator is available or responds to the GUI restriction and anonymization program.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a GUI restriction and anonymization program 110a. The networked computer environment 100 may also include a server 112 that is enabled to run a GUI restriction and anonymization program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 3, server computer 112 may include internal components 902a and external components 904a, respectively, and client computer 102 may include internal components 902b and external components 904b, respectively. Server computer 112 may also operate in a cloud computing service model, such as Software as a Service (SaaS), Analytics as a Service (AaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the GUI restriction and anonymization program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the GUI restriction and anonymization program 110a, 110b (respectively) to permit the user to anonymize the GUI or restrict access to the GUI while another person remotely accesses the user's computer system. The restricting and anonymizing GUI method is explained in more detail below with respect to FIG. 2.

Figure 2:
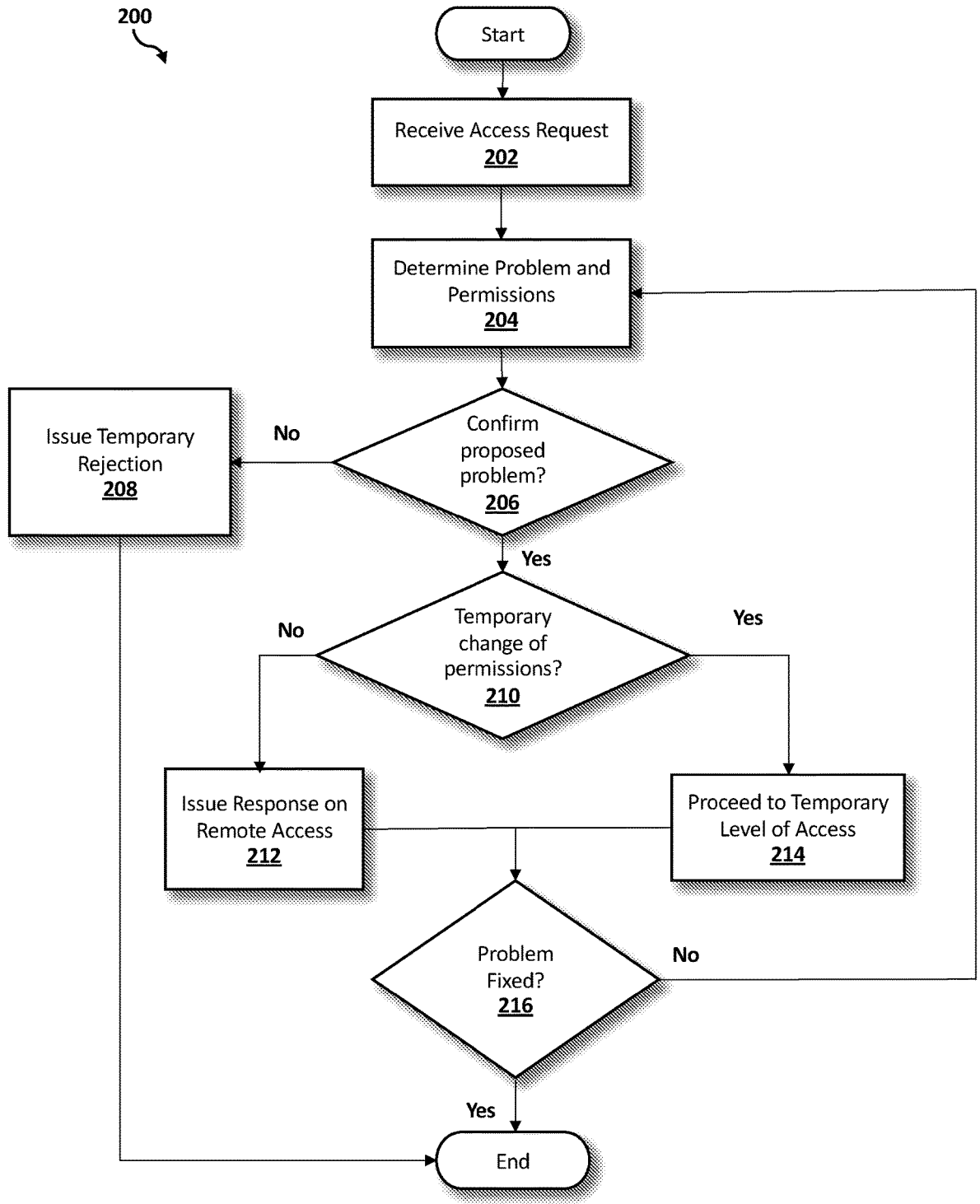
FIG. 2 is an operational flowchart illustrating a process for restricting and anonymizing GUI for remote access according to at least one embodiment.

Referring now to FIG. 2, an operational flowchart illustrating the exemplary restricting and anonymizing GUI process for remote access 200 used by the GUI restriction and anonymization program 110a and 110b according to at least one embodiment is depicted.

At 202, a request for remote access is received. The GUI restriction and anonymization program 110a and 110b may receive a request sent by a third party (e.g., remote support representative) to access the GUI associated with the client computer 102. Such a request for remote access may be sent as a message to the customer system administrator (i.e., user) in which the GUI restriction and anonymization program 110a and 110b may determine that a third party is attempting to access the GUI associated with the client computer 102. For example, the customer system administrator is experiencing a problem with the client computer 102 associated with the customer system administrator's work. The client computer 102 periodically shuts off and the customer system administrator restarts the client computer 102 each time the client computer 102 shuts off. The customer system administrator lost several important documents that the customer system administrator spent countless hours unsuccessfully attempting to retrieve. As a result, the customer system administrator contacted the vendor's IT department, and the Tech Support representative decides to obtain remote access into the client computer 102 to resolve the problem. The Tech Support representative, then, sends an access request to the client computer 102.

Next, at 204, the GUI restriction and anonymization program 110a and 110b determines the problem and permissions depending on the problem (i.e., issue) with the client computer 102. The cognitive processing system may utilize computing technology to analyze the client computer 102 and diagnose the problem with the client computer 102. After the cognitive processing system diagnoses the problem, the cognitive processing system may determine the appropriate permissions or access that the third party should obtain to fix the problem presented by the cognitive processing system. Permissions may include anonymizing information (e.g., company name, IP addresses), deletion of private information, adding or removing passwords to sensitive data or parts of the client computer 102, hiding or restricting access until approval is obtained by the customer system administrator, and prohibiting system configuration changes without approval of customer system administrator. As such, the GUI restriction and anonymization program 110a and 110b may use the cognitive processing system to determine the minimum access level that the third party may need to fix the problem, without accessing the restricted level of access, or anonymized data or information. Continuing the previous example, the cognitive processing system analyzes the client computer 102, diagnoses the problem associated with the client computer 102, and determines the appropriate permissions to fix the problem. The cognitive processing system diagnoses that the several sensitive files located on the client computer 102 may be infected. As such, the third party may have to obtain access to these sensitive files to fix the problem.

Then, at 206, the GUI restriction and anonymization program 110a and 110b determines if the customer system administrator confirmed the proposed problem. The GUI restriction and anonymization program 110a and 110b may inform the customer system administrator (e.g., via a dialog box) of the determined problem with the client computer 102 and prompt the customer system administrator to agree with the proposed problem determined by the cognitive processing system. According to at least one other embodiment, if the customer system administrator fails to confirm the proposed problem within a specific time previously defined by the customer system administrator, then the GUI restriction and anonymization program 110a and 110b may determine that the customer system administrator is not at the client computer 102 and may notify the customer system administrator via mobile device, email or other electronic methods that the attention of the customer system administrator may be necessary due to a request for remote access of the client computer 102 associated with the customer system administrator. Regardless of whether the customer system administrator may be notified on the client computer 102 or by other electronic methods, the customer system administrator may be presented with a brief explanation of the proposed problem provided by the cognitive processing system and may choose to agree or disagree with the proposed problem. If the customer system administrator is notified via other electronic methods, then the dialog box may be embedded in the notification. The dialog box may include a brief explanation of the proposed problem, and "Agree" and "Disagree" buttons at the bottom of the dialog box. Therefore, the customer system administrator may decide to agree or disagree with the proposed problem provided by the cognitive processing system. After the GUI restriction and anonymization program 110a and 110b has determined that the customer system administrator has clicked to agree or disagree with the proposed problem provided by the cognitive processing system, then the dialog box may disappear.

If the customer system administrator is unavailable, or fails to respond to the notification or prompt that the attention of the customer system administrator may be necessary due to a remote access request, then the customer system administrator may select a secondary person (i.e., manager, trusted family member or trusted friend) to receive notifications associated with a request for remote access of the client computer 102 for the customer system administrator. The customer system administrator may define the specific amount of time that may lapse before the secondary person is notified. If the specific amount of time has lapsed with no response from the customer system administrator, then the secondary person may be notified via electronic methods (e.g., email, mobile device) that the secondary person has been designated by the unresponsive customer system administrator, and the attention of the secondary person may be necessary due to a remote access request to the client computer 102 for the customer system administrator. The secondary person may be prompted with the same dialog box as the customer system administrator briefly explaining the proposed problem provided by the cognitive processing system, and the secondary person may choose to agree or disagree with the proposed problem.

If, however, the customer system administrator fails to designate a secondary person, or fails to select the option to designate a secondary person, then the remote access request may be declined. The third party requesting remote access and the customer system administrator may be notified that the remote access request has been declined since the customer system administrator has been unresponsive.

Continuing the previous example, the customer system administrator was not at the client computer 102. As such, the GUI restriction and anonymization program 110a and 110b sends an email notification to the customer system administrator. The customer system administrator, however, fails to respond within the predetermined 15 minutes after the email notification was sent to the customer system administrator. Since the customer system administrator designated the department manager as the secondary person, the GUI restriction and anonymization program 110a and 110b sends an email notification to the department manager. The department manager promptly opens the email notification, which includes a message stating that the department manager has been designated by the customer system administrator as the secondary person. In addition, the department manager's attention is requested due to a remote access request to the client computer 102 for the customer system administrator. The email notification further includes a dialog box that states the proposed problem with the client computer 102 is that several files are infected by a virus, and "Agree" and "Disagree" buttons at the bottom of the dialog box. The customer system administrator previously informed the department manager of the recent problems with the client computer 102. As such, the department manager promptly read the proposed problem and clicked "Agree" to confirm the proposed problem with the client computer 102. Then, the dialog box embedded in the email notification disappears.

If the GUI restriction and anonymization program 110a and 110b determines that the customer system administrator or the secondary person either disagrees with the proposed problem provided by the cognitive processing system, or fails to respond to the notification at 206, then the GUI restriction and anonymization program 110a and 110b may issue a temporary rejection of the remote access at 208. The third party requesting remote access, the customer system administrator and secondary person (if applicable) may receive a notification via electronic methods that the remote access has been temporarily rejected. The notification sent to the customer system administrator may include instructions on how to reinitiate the GUI restriction and anonymization program 110a and 110b.

Continuing the previous example, if the department manager clicked the "Disagree" button to indicate that the department manager disagrees with the proposed problem in the email notification, the customer system administrator never previously designated anyone as the secondary person, or the department manager failed to respond to the email notification within the previously determined 15 minutes after the email notification to the department manager was sent, then the GUI restriction and anonymization program 110a and 110b may terminate, and the third party access may be temporarily rejected. The customer system administrator, department manager (if designated as secondary person) and the third party requesting remote access may receive an email notification stating that remote access has been temporarily rejected. The email notification sent to the customer system administrator may include instructions on how to reinitiate the GUI restriction and anonymization program 110a and 110b.

If, however, the GUI restriction and anonymization program 110a and 110b determines the designated administrator (i.e., customer system administrator or secondary person, if applicable) agrees to the proposed problem provided by the cognitive processing system at 206, then the GUI restriction and anonymization program 110a and 110b determines if the designated administrator selects to temporarily change the permissions granted to the third party requesting remote access at 210. If the customer system administrator is at the client computer 102, then the customer system administrator may receive a dialog box on the screen. If, however, the designated administrator is not at the client computer 102, then the designated administrator may be notified by electronic methods in which the dialog box may be embedded within the notification. The dialog box may include the panels of the GUI or information that the third party requesting remote access may have to access to fix the proposed problem and a brief description indicating whether these panels of the GUI and information may be restricted or anonymized during the remote access session of the third party. At the bottom of the dialog box, the designated administrator may be prompted as to whether the designated administrator requests temporary changes to the pre-defined permissions, and the designated administrator may click the "Yes" or "No" buttons underneath the prompt on temporary changes of permissions. Therefore, the designated administrator may temporarily change the permissions that the third party requesting remote access may obtain. The designated administrator may provide only temporary changes for the current remote access session without changing the previously defined default permissions.

Continuing the previous example, since the department manager confirmed the proposed problem, the GUI restriction and anonymization program 110a and 110b sends the department manager and the unresponsive customer system administrator an email notification. A dialog box is embedded in the email notification, which includes the panels of the GUI or information that the third party requesting remote access may have to access to fix the proposed problem and a brief description indicating whether these panels of the GUI and information are restricted or anonymized. At the bottom of the dialog box, the department manager is asked whether the department manager requests temporary changes to the pre-defined permissions with "Yes" or "No" buttons underneath. The dialog box states that the Tech Support representative may have to obtain access to the several sensitive files which are password protected. The names and location of these sensitive files are included in the dialog box for the review of the department manager. In addition, the dialog box confirms that certain default pre-defined settings, such as IP addresses, personal identifiers (e.g., social security numbers, names, personal addresses, and account numbers), and other sensitive information are anonymized during the remote access session of the third party and may not be changed. The department manager decides to temporarily change the permissions to remove the password protection on the sensitive files. As such, the department manager clicks "Yes" at the bottom of the dialog box to temporarily change the permissions on the client computer 102.

If the GUI restriction and anonymization program 110a and 110b determines that the designated administrator decides not to implement new temporary changes to the permissions at 210, then the GUI restriction and anonymization program 110a and 110b will issue a response with respect to the remote access to the customer system administrator, secondary person (if applicable) and the third party requesting remote access at 212. The email notification may confirm that no changes were made to the permissions on the client computer 102. Continuing the previous example, if the department manager selected "No" to temporary changes to the permissions on the client computer 102, then the GUI restriction and anonymization program 110a and 110b will issue an email notification to the customer system administrator, department manager and the Tech Support representative stating that no permission changes were made to the client computer 102.

If, however, the GUI restriction and anonymization program 110a and 110b determines that the designated administrator decides to temporarily change the permissions at 210, then the GUI restriction and anonymization program 110a and 110b may proceed to the temporary level of access at 214. When the designated administrator selects the option to implement temporary permission changes, another dialog box may appear. The dialog box may include a list of all the previously defined permissions. Next, to each permission may be a designation to include whether that part of the GUI or information is restricted or anonymized. Except the default permissions which may not be changed, the permissions may have a box next to each designation in which the designated administrator may click to change the designation. Therefore, the designated administrator may change a designation, for example, from restricted to unrestricted, anonymized to not anonymized by clicking the box next to the appropriate permission in the dialog box. At the bottom of the dialog box may be a "Submit" button which the designated administrator may click when all temporary changes have been made. Thereafter, the GUI restriction and anonymization program 110a and 110b may implement the temporary permission changes and the third party may proceed to the temporary level of access for the client computer 102 using the newly defined temporary permissions.

Continuing the previous example, since the department manager decided to implement temporary changes on the permissions of the client computer 102, another dialog box is presented in which the department manager clicks on a box next to the several password-protected sensitive files to indicate that the department manager is changing the permissions for the files. The department manager, then, clicks the "Submit" button. Thereafter, the department manager is prompted to enter the password to remove the password protection on sensitive files. The department manager provides the password previously provided by the customer system administrator and the prompt and the dialog box disappears.

If the GUI restriction and anonymization program 110a and 110b issues a response to remote access at 212, or proceeds to the temporary level of access at 214, then, at 216, the third party requesting remote access gains access to the client computer 102. The access granted to the third party may be limited to the permissions gained by the designated administrator. Therefore, the third party may attempt to fix the problem to the client computer 102 based on the permissions provided by the designated administrator. Continuing the previous example, the Tech Support representative will gain remote access to the client computer 102 to fix the problem. Based on the default settings and the temporary permission changes made by the department manager, the Tech Support representative will have access to the several sensitive files that were previously password protected. The default settings, however, will remain, such as IP addresses, personal identifiers (e.g., social security numbers, names, personal addresses and account numbers), and other confidential information remain anonymized and unchanged.

If the client computer 102 problem is fixed, then the GUI restriction and anonymization program 110a and 110b notifies the customer system administrator, secondary person (if applicable), and the third party that the client computer 102 problem has been successfully resolved. Thereafter, the remote access session may end for the third party, and temporary permission changes may automatically expire. Continuing the previous example, after the Tech Support representative gains access to the client computer 102 and the several sensitive files, the Tech Support representative fixes the problem with the client computer 102. Thereafter, the GUI restriction and anonymization program 110a and 110b sends an email notification to the customer system administrator, department manager and Tech Support representative indicating that the problem has been successfully resolved. The GUI restriction and anonymization program 110a and 110b, then, terminates the remote access session and removes all temporary changes to the permissions to the client computer 102. As such, the password protection is reinstated for the several sensitive files.

If the client computer 102 problem has not been fixed, then the GUI restriction and anonymization program 110a and 110b notifies the customer system administrator, secondary person (if applicable) and third party requesting remote access that the problem was not fixed. The remote access session may be terminated. Then, GUI restriction and anonymization program 110a and 110b may return to the cognitive processing system at 204 to reassess the problem and permissions. The GUI restriction and anonymization program 110a and 110b may continue until either the problem is fixed, or the designated administrator decides to terminate the GUI restriction and anonymization program 110a and 110b by failing to confirm the proposed problem at 206, or shutting down the client computer 102 and not restarting the GUI restriction and anonymization program 110a and 110b.

Continuing the previous example, if the GUI restriction and anonymization program 110a and 110b determines that the problem has not been fixed during the remote access session, then the Tech Support representative, customer system administrator and department manager will receive email notification indicating the problem has not be resolved. The remote access session is terminated, and the cognitive processing system at 204 will reassess the problem and permissions that the Tech Support representative should obtain to fix the problem and to confirm the proposed problem with the client computer 102. The GUI restriction and anonymization program 110a and 110b may continue until the problem is fixed, or the department manager decides to terminate the GUI restriction and anonymization program 110a and 110b by failing to confirm the proposed problem at 206, or shutting down the client computer 102 and failing to restart the GUI restriction and anonymization program 110a and 110b.

It may be appreciated that FIG. 2 provides only an illustration of one embodiment and does not imply any limitations with regard to how different embodiments may be implemented. Many modifications to the depicted embodiment(s) may be made based on design and implementation requirements.

Figure 3:
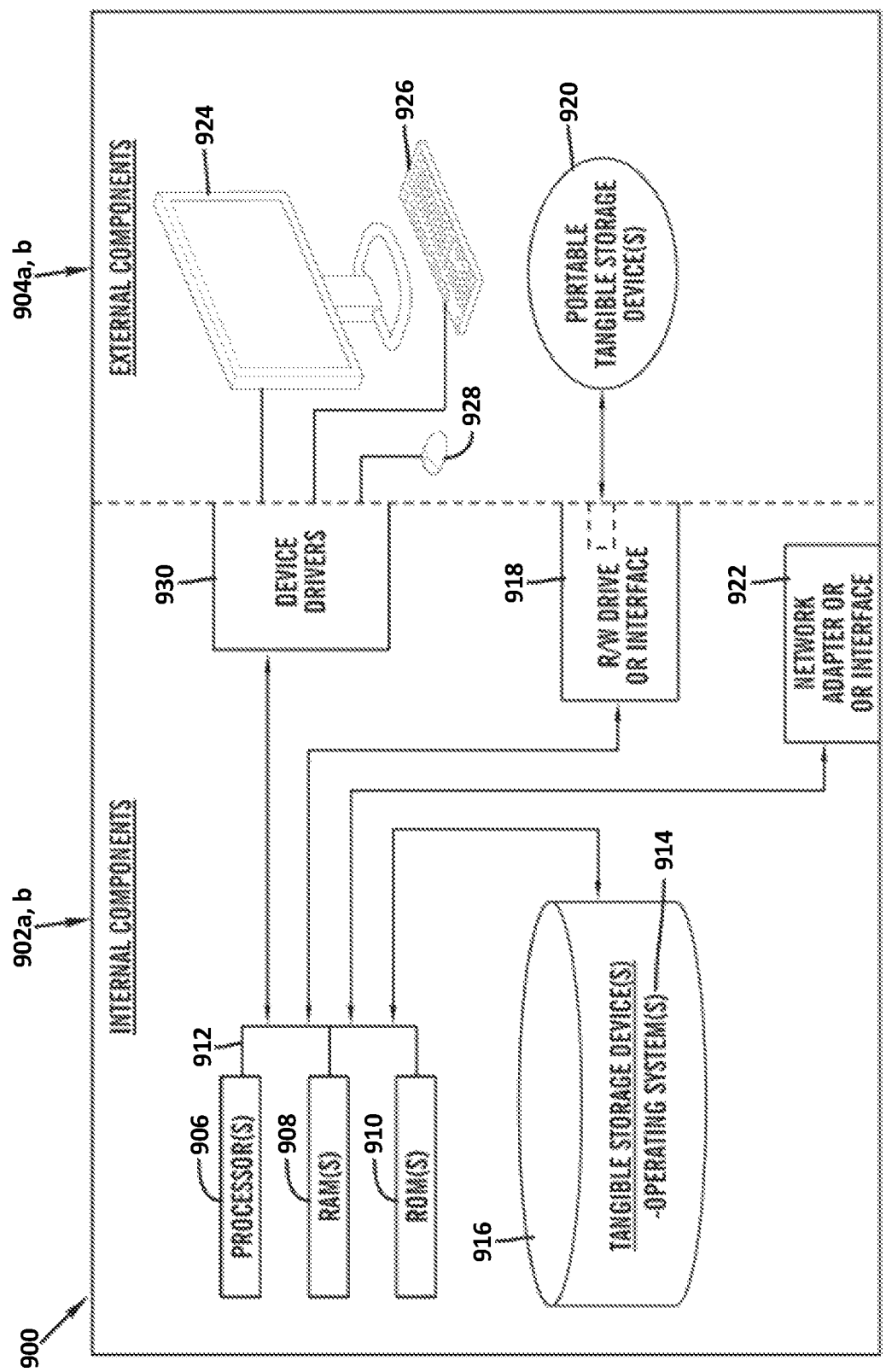
FIG. 3 is a block diagram of internal and external components of computers and servers depicted in FIG. 1 according to at least one embodiment.

FIG. 3 is a block diagram 900 of internal and external components of computers depicted in FIG. 1 in accordance with an illustrative embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 a, b and external components 904 a, b illustrated in FIG. 3. Each of the sets of internal components 902 a, b includes one or more processors 906, one or more computer-readable RAMs 908, and one or more computer-readable ROMs 910 on one or more buses 912, and one or more operating systems 914 and one or more computer-readable tangible storage devices 916. The one or more operating systems 914, the software program 108 and the GUI restriction and anonymization program 110a in client computer 102, and the GUI restriction and anonymization program 110b in network server 112 may be stored on one or more computer-readable tangible storage devices 916 for execution by one or more processors 906 via one or more RAMs 908 (which typically include cache memory). In the embodiment illustrated in FIG. 3, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the GUI restriction and anonymization program 110a and 110b can be stored on one or more of the respective portable computer-readable tangible storage devices 920, read via the respective R/W drive or interface 918, and loaded into the respective hard drive 916.

Each set of internal components 902 a, b may also include network adapters (or switch port cards) or interfaces 922 such as a TCP/IP adapter cards, wireless Wi-Fi interface cards, or 3G or 4G wireless interface cards or other wired or wireless communication links. The software program 108 and the GUI restriction and anonymization program 110a in client computer 102 and the GUI restriction and anonymization program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the GUI restriction and anonymization program 110a in client computer 102 and the GUI restriction and anonymization program 110b in network server computer 112 are loaded into the respective hard drive 916. The network may comprise copper wires, optical fibers, wireless transmission, routers, firewalls, switches, gateway computers and/or edge servers.

Each of the sets of external components 904 a, b can include a computer display monitor 924, a keyboard 926, and a computer mouse 928. External components 904 a, b can also include touch screens, virtual keyboards, touch pads, pointing devices, and other human interface devices. Each of the sets of internal components 902 a, b also includes device drivers 930 to interface to computer display monitor 924, keyboard 926, and computer mouse 928. The device drivers 930, R/W drive or interface 918, and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Analytics as a Service (AaaS): the capability provided to the consumer is to use web-based or cloud-based networks (i.e., infrastructure) to access an analytics platform. Analytics platforms may include access to analytics software resources or may include access to relevant databases, corpora, servers, operating systems or storage. The consumer does not manage or control the underlying web-based or cloud-based infrastructure including databases, corpora, servers, operating systems or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
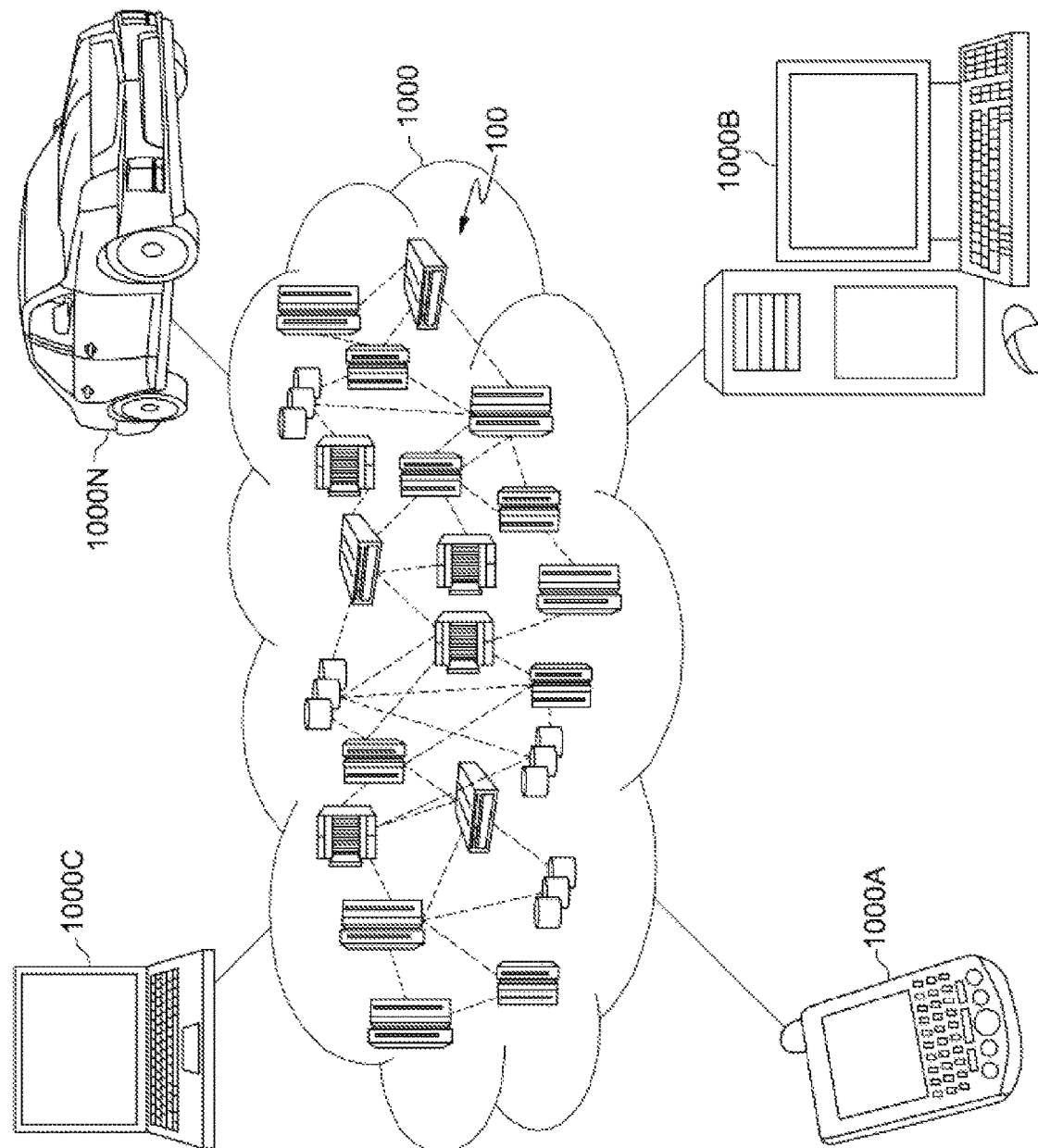
FIG. 4 is a block diagram of an illustrative cloud computing environment including the computer system depicted in FIG. 1, in accordance with an embodiment of the present disclosure.

Referring now to FIG. 4, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 4 are intended to be illustrative only and that computing nodes 100 and cloud computing environment 1000 can communicate with any type of computerized device over any type of network and/or network addressable connection (e.g., using a web browser).

Figure 5:
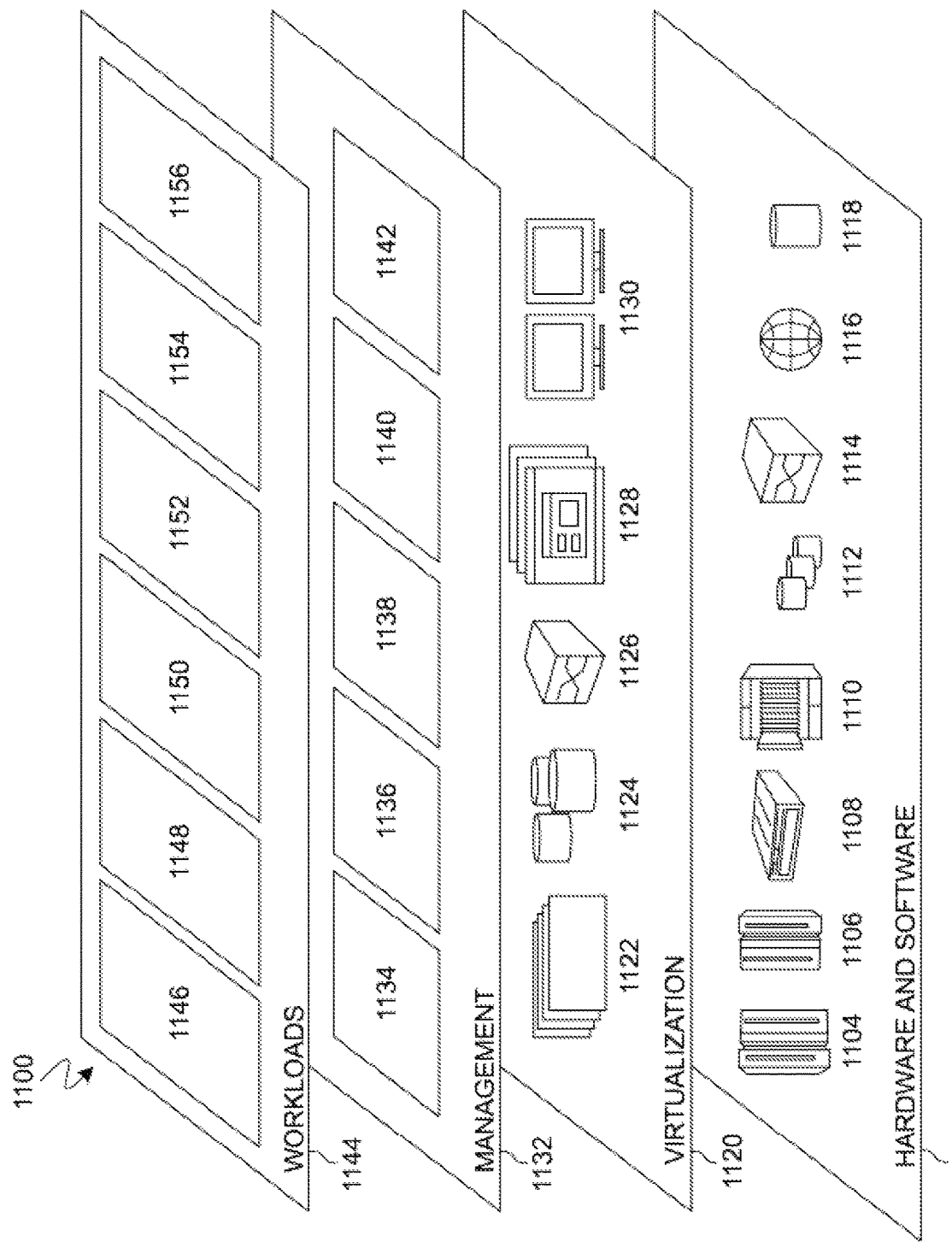
FIG. 5 is a block diagram of functional layers of the illustrative cloud computing environment of FIG. 4, in accordance with an embodiment of the present disclosure.

Referring now to FIG. 5, a set of functional abstraction layers 1100 provided by cloud computing environment 1000 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and GUI restriction and anonymization 1156. A GUI restriction and anonymization program 110a, 110b provides a way to allow the user to anonymize the GUI or restrict access to the GUI while another person remotely accesses the user's computer system.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for restricting and anonymizing a graphical user interface for a remote access session, the method comprising:

determining a plurality of appropriate permissions for the graphical user interface of a client computer for fixing a problem,
  wherein the determined plurality of appropriate permissions is structured based on a specific service user role of the client computer having a predefined configuration,
  wherein a plurality of sensitive data is determined within the graphical user interface based on the determined plurality of appropriate permissions,
  wherein the plurality of sensitive data is anonymized; and determining a plurality of restricted graphical user interface panels associated with the graphical user interface,
  wherein the determined plurality of restricted graphical user interface panels includes a minimum access level for a third party to fix the problem.

2. The method of claim 1, further comprising:
receiving a remote access request, from the third party, to fix the problem associated with the client computer; and
determining the problem associated with the client computer.

3. The method of claim 1, further comprising:
presenting the problem and the determined plurality of appropriate permissions to a user; and
receiving a user confirmation,
  wherein the user confirmation indicates the user agrees with the problem.

4. The method of claim 1, further comprising:
receiving a user decision to change a plurality of previously defined permissions in response to presenting the determined plurality of appropriate permissions to the user; and
changing the determined plurality of appropriate permissions before granting the remote access session to the third party.

5. The method of claim 1, further comprising:
receiving a user decision to change a plurality of previously defined permissions in response to presenting the determined plurality of appropriate permissions to the user; and
changing the determined plurality of appropriate permissions based on the received user decision,
  wherein the changed plurality of appropriate permissions apply for a duration of the remote access session of the third party.

6. The method of claim 1, wherein determining the plurality of appropriate permissions for the graphical user interface of the client computer for fixing the problem, further comprises:

determining a graphical user interface panel associated with the problem;

determining the plurality of restricted graphical user interface panels associated with the graphical user interface;

determining the plurality of appropriate permissions based on the plurality of restricted graphical user interface panels and a plurality of anonymized data to fix the problem; and presenting to a user the determined plurality of appropriate permissions.

7. The method of claim 6, further comprising:

determining that the user applied a plurality of temporary changes to the determined plurality of appropriate permissions; and granting remote access to the third party to fix the problem, wherein the third party is allowed access based on the determined plurality of temporary changes.

8. The method of claim 6, further comprising:

determining that no changes were made to determined plurality of appropriate permissions in the graphical user interface; and granting remote access to the third party to fix the problem, wherein the third party is allowed access based on the determined plurality of appropriate permissions.

9. The method of claim 7, further comprising:

terminating the granted remote access to the third party; and reverting the plurality of temporary changes back to the plurality of previously defined permissions corresponding with the determined plurality of appropriate permissions.

10. The method of claim 3, further comprising:

determining the user is not currently at the client computer;

notifying the user of a remote access request by an alternate electronic method; and receiving from the user a confirmation of the problem by the alternate electronic method, wherein the received confirmation includes a decision indicating whether to change the determined plurality of appropriate permissions.

11. A computer system for restricting and anonymizing a graphical user interface for a remote access session, comprising:

one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:

determining a plurality of appropriate permissions for the graphical user interface of a client computer for fixing a problem, wherein the determined plurality of appropriate permissions is structured based on a specific service user role of the client computer having a predefined configuration, wherein a plurality of sensitive data is determined within the graphical user interface based on the determined plurality of appropriate permissions, wherein the plurality of sensitive data is anonymized; and determining a plurality of restricted graphical user interface panels associated with the graphical user interface, wherein the determined plurality of restricted graphical user interface panels includes a minimum access level for a third party to fix the problem.

12. The computer system of claim 11, further comprising:

receiving a remote access request, from the third party, to fix the problem associated with the client computer; and determining the problem associated with the client computer.

13. The computer system of claim 11, further comprising:

presenting the problem and the determined plurality of appropriate permissions to a user; and receiving a user confirmation, wherein the user confirmation indicates the user agrees with the problem.

14. The computer system of claim 11, further comprising:

receiving a user decision to change a plurality of previously defined permissions in response to presenting the determined plurality of appropriate permissions to the user; and changing the determined plurality of appropriate permissions before granting the remote access session to the third party.

15. The computer system of claim 11, further comprising:

receiving a user decision to change a plurality of previously defined permissions in response to presenting the determined plurality of appropriate permissions to the user; and changing the determined plurality of appropriate permissions based on the received user decision, wherein the changed plurality of appropriate permissions apply for a duration of the remote access session of the third party.

16. A computer program product for restricting and anonymizing a graphical user interface for a remote access session, comprising:

one or more computer-readable storage media and program instructions stored on at least one of the one or more tangible storage media, the program instructions executable by a processor to cause the processor to perform a method comprising:

determining a plurality of appropriate permissions for the graphical user interface of a client computer for fixing a problem, wherein the determined plurality of appropriate permissions is structured based on a specific service user role of the client computer having a predefined configuration, wherein a plurality of sensitive data is determined within the graphical user interface based on the determined plurality of appropriate permissions, wherein the plurality of sensitive data is anonymized; and determining a plurality of restricted graphical user interface panels associated with the graphical user interface, wherein the determined plurality of restricted graphical user interface panels includes a minimum access level for a third party to fix the problem.

17. The computer program product of claim 16, further comprising:

receiving a remote access request, from the third party, to fix the problem associated with the client computer; and determining the problem associated with the client computer.

18. The computer program product of claim 16, further comprising:
- presenting the problem and the determined plurality of appropriate permissions to a user; and
- receiving a user confirmation,
  - wherein the user confirmation indicates the user agrees with the problem.

19. The computer program product of claim 16, further comprising:
- receiving a user decision to change a plurality of previously defined permissions in response to presenting the determined plurality of appropriate permissions to the user; and
- changing the determined plurality of appropriate permissions before granting the remote access session to the third party.

20. The computer program product of claim 16, further comprising:
- receiving a user decision to change a plurality of previously defined permissions in response to presenting the determined plurality of appropriate permissions to the user; and
- changing the determined plurality of appropriate permissions based on the received user decision,
  - wherein the changed plurality of appropriate permissions apply for a duration of the remote access session of the third party.

* * * * *